United States Patent [19]
Stockwell et al.

[11] Patent Number: 6,072,942
[45] Date of Patent: *Jun. 6, 2000

[54] SYSTEM AND METHOD OF ELECTRONIC MAIL FILTERING USING INTERCONNECTED NODES

[75] Inventors: Edward B. Stockwell, St. Paul; Paula Budig Greve, St. Anthony, both of Minn.

[73] Assignee: Secure Computing Corporation, Roseville, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/715,336

[22] Filed: Sep. 18, 1996

[51] Int. Cl.$^7$ .................................................... G06F 13/00
[52] U.S. Cl. ............................. 395/200.36; 395/187.01
[58] Field of Search ................... 395/200.34, 200.35, 395/200.31, 200.37, 200.32, 754, 759, 12, 672, 680, 186, 187.01, 200.8; 345/356

[56] References Cited

U.S. PATENT DOCUMENTS

| | | | |
|---|---|---|---|
| 3,956,615 | 5/1976 | Anderson et al. | 380/24 |
| 4,104,721 | 8/1978 | Markstein et al. | 711/164 |
| 4,177,510 | 12/1979 | Appell et al. | 711/163 |
| 4,442,484 | 4/1984 | Childs, Jr. et al. | 711/163 |
| 4,584,639 | 4/1986 | Hardy | 395/186 |
| 4,621,321 | 11/1986 | Boebert et al. | 707/8 |
| 4,648,031 | 3/1987 | Jenner | 395/182.08 |
| 4,661,951 | 4/1987 | Segarra | 370/475 |
| 4,701,840 | 10/1987 | Boebert et al. | 395/186 |
| 4,713,753 | 12/1987 | Boebert et al. | 711/164 |
| 4,870,571 | 9/1989 | Frink | 395/220.54 |
| 4,885,789 | 12/1989 | Burger et al. | 380/25 |

(List continued on next page.)

FOREIGN PATENT DOCUMENTS

| | | | |
|---|---|---|---|
| 0420779 | 4/1991 | European Pat. Off. | H04L 12/54 |
| 0653862 | 5/1995 | European Pat. Off. | H04L 12/02 |
| 0 720 333 A2 | 7/1996 | European Pat. Off. | H04L 12/58 |
| 0 743 777 A2 | 11/1996 | European Pat. Off. | H04L 29/06 |
| 2 238 212 | 5/1991 | United Kingdom | H04L 12/22 |
| 2 287 619 | 9/1995 | United Kingdom | H04L 12/22 |
| 96/13113 | 5/1996 | WIPO | H04L 29/06 |
| 96/31035 | 10/1996 | WIPO | H04L 12/24 |

(List continued on next page.)

OTHER PUBLICATIONS

International Search Report, PCT Application No. PCT/US 95/12681, 8 p., (mailed Apr. 9, 1996).

Cobb, S., "Establishing Firewall Policy", *IEEE*, 198–205, (1996).

"100% of Hackers Failed to Break Into One Internet Site Protected by Sidewinder", News Release, Secure Computing Corporation (Feb. 16, 1995).

"Internet Security System Given 'Product of the Year' Award", News Release, Secure Computing Corporation (Mar. 28, 1995).

(List continued on next page.)

*Primary Examiner*—Parshotam S. Lall
*Assistant Examiner*—Viet Vu
*Attorney, Agent, or Firm*—Schwegman, Lundberg, Woessner & Kluth, P.A.

[57] ABSTRACT

A system and method for filtering electronic mail messages is described. A message is received an processed through a one or more filter flows. Each filter flow is comprised of one or more self-contained nodes which can be combined in whatever order is required to enforce a given security policy. Node independence provides a policy-neutral environment for constructing filter flows. A filter flow may be as simple as forwarding the mail to the intended recipient, or may perform one or more checks where it decides whether to forward, reject, return (or some combination thereof) the message. Certain node types are also able to append information on to a mail message, while others are able to modify certain parts of a mail message. Several of the node types are able to generate audit or log messages in concert with processing a mail message.

27 Claims, 12 Drawing Sheets

U.S. PATENT DOCUMENTS

| | | | |
|---|---|---|---|
| 4,914,568 | 4/1990 | Kodosky et al. | 395/349 |
| 4,914,590 | 4/1990 | Loatman et al. | 395/759 |
| 5,093,914 | 3/1992 | Coplien et al. | 395/704 |
| 5,204,961 | 4/1993 | Barlow | 395/187.01 |
| 5,272,754 | 12/1993 | Boebert | 380/25 |
| 5,276,735 | 1/1994 | Boebert et al. | 380/21 |
| 5,305,385 | 4/1994 | Schanning et al. | 380/49 |
| 5,311,593 | 5/1994 | Carmi | 380/23 |
| 5,333,266 | 7/1994 | Boaz et al. | 395/200.36 |
| 5,377,349 | 12/1994 | Motomura | 707/7 |
| 5,377,354 | 12/1994 | Scannell et al. | 395/680 |
| 5,414,833 | 5/1995 | Hershey et al. | 395/187.01 |
| 5,416,842 | 5/1995 | Aziz | 380/30 |
| 5,418,951 | 5/1995 | Damashek | 707/5 |
| 5,485,460 | 1/1996 | Schrier et al. | 395/200.57 |
| 5,530,758 | 6/1996 | Marino, Jr. et al. | 380/49 |
| 5,548,646 | 8/1996 | Aziz et al. | 380/23 |
| 5,550,984 | 8/1996 | Gelb | 395/200.75 |
| 5,555,346 | 9/1996 | Gross et al. | 706/45 |
| 5,586,260 | 12/1996 | Hu | 395/187.01 |
| 5,606,668 | 2/1997 | Shwed | 395/187.01 |
| 5,619,648 | 4/1997 | Canale et al. | 395/200.36 |
| 5,623,601 | 4/1997 | Vu | 395/187.01 |
| 5,632,011 | 5/1997 | Landfield et al. | 345/326 |
| 5,634,084 | 5/1997 | Malsheen | 704/260 |
| 5,644,571 | 7/1997 | Seaman | 370/401 |
| 5,673,322 | 9/1997 | Pepe et al. | 380/49 |
| 5,684,951 | 11/1997 | Goldman et al. | 395/188.01 |
| 5,689,566 | 11/1997 | Nguyen | 380/25 |
| 5,699,513 | 12/1997 | Feigen et al. | 395/187.01 |
| 5,706,507 | 1/1998 | Schloss | 707/104 |
| 5,715,466 | 2/1998 | Flanagan | 704/5 |
| 5,717,913 | 2/1998 | Driscoll | 707/5 |
| 5,720,035 | 2/1998 | Allegre et al. | 395/200.55 |
| 5,781,550 | 7/1998 | Templin et al. | 370/401 |

FOREIGN PATENT DOCUMENTS

| | | | |
|---|---|---|---|
| 96/35994 | 11/1996 | WIPO | G06F 13/14 |
| 97/13340 | 4/1997 | WIPO | H04L 9/00 |
| 97/16911 | 5/1997 | WIPO | H04L 29/06 |
| 97/29413 | 8/1997 | WIPO | . |

OTHER PUBLICATIONS

"Satan No Threat to Sidewinder™", News Release, Secure Computing Corporation (Apr. 26, 1995).

"Answers to Frequently Asked Questions About Network Security", Secure Computing Corporation, 41 p. (1994).

"Sidewinder Internals", Secure Computing Corporation, 16 p. (Date Unavailable).

Adam, J.A., "Meta–matrices", *IEEE Spectrum*, 26–27 (Oct. 1992).

Adam, J.A., "Playing on the Net", *IEEE Spectrum*, 29 (Oct. 1992).

Ancilotti, P., et al., "Language Features for Access Control", *IEEE Transactions on Software Engineering*, SE–9, 16–25 (Jan. 1983).

Baclace, P.E., "Competitive Agents for Information Filtering", *Communications of the ACM*, 35, 50 (Dec. 1992).

Badger, L., et al., "Practical Domain and Type Enforcement for UNIX", *Proceedings of the 1995 IEEE Symposium on Security and Privacy*, Oakland, CA, 66–77 (May 8–10, 1995).

Belkin, N.J., et al., "Information Filtering and Information Retrieval: Two Sides of the Same Coin?", *Communications of the ACM*, 35, 29–38 (Dec. 1992).

Bellovin, S.M., et al., "Network Firewalls", *IEEE Communications Magazine*, 32, 50–57 (Sep. 1994).

Bevier, W.R., et al., "Connection Policies and Controlled Interference", *Proceedings of the 8th IEEE Computer Security Foundations Workshop*, Kenmare, County Kerry, Ireland, 167–176 (Jun. 13–15, 1995).

Bowen, T.F., et al., "The Datacycle Architecture", *Communications of the ACM*, 35, 71–81 (Dec. 1992).

Bryan, J., "Firewalls For Sale", *BYTE*, pp. 99–100, 102 and 104 (Apr. 1995).

Damashek, M., "Gauging Similarity with n–Grams: Language–Independent Categorization of Text", *Science*, 267, 843–848 (Feb. 10, 1995).

Fine, T., et al., "Assuring Distributed Trusted Mach", *Proceedings of the 1993 IEEE Computer Society Symposium on Research in Security and Privacy*, 206–218 (1993).

Foltz, P.W., et al., "Personalized Information Delivery: An Analysis of Information Filtering Methods", *Communications of the ACM*, 35, 51–60 (Dec. 1992).

Goldberg, D., et al., "Using Collaborative Filtering to Weave an Information Tapestry", *Communications of the ACM*, 35, 61–70 (Dec. 1992).

Grampp, F.T., "UNIX Operating System Security", *AT&T Bell Laboratories Technical Journal*, 63, 1649–1672 (Oct. 1984).

Haigh, J.T., et al., "Extending the Non–Interference Version of MLS for SAT", *Proceedings of the 1986 IEEE Symposium on Security and Privacy*, Oakland, CA, 232–239 (Apr. 7–9, 1986).

Kent, S.T., "Internet Privacy Enhanced Mail", *Communications of the ACM*, 36, 48–60 (Apr. 1993).

Lee, K.–C., et al., "A Framework for Controlling Cooperative Agents", *Computer*, 8–16, (Jul. 1993).

Loeb, S., "Architecting Personalized Delivery of Multimedia Information", *Communications of the ACM*, 35, 39–50 (Dec. 1992).

Loeb, S., et al., "Information Filtering," *Communications of the ACM*, 35, 26–28 (Dec. 1992).

Merenbloom, P., "Network 'Fire Walls' Safeguard LAN Data from Outside Intrusion", *InfoWorld*, p. 69 (Jul. 25, 1994).

Obraczka, K., et al., "Internet Resource Discovery Services", *Computer*, 26, 8–22 (Sep. 1993).

Press, L., "The Net: Progress and Opportunity", *Communications of the ACM*, 35, 21–25 (Dec. 1992).

Schwartz, M.F., "Internet Resource Discovery at the University of Colorado", *Computer*, 26, 25–35 (Sep. 1993).

Smith, R.E., "Sidewinder: Defense in Depth Using Type Enforcement", *International Journal of Network Management*, 219–229, (Jul.–Aug. 1995).

Stadnyk I., et al., "Modelling Users' Interests in Information Filters", *Communications of the ACM*, 35, 49 (Dec. 1992).

Stevens, C., "Automating the Creation of Information Filters", *Communications of the ACM*, 35, 48 (Dec. 1992).

Thomsen, D., "Type Enforcement: The New Security Model", *Proceedings of the SPIE, Multimedia: Full–Service Impact on Business, Education and the Home*, vol. 2617, Philadelphia, PA, 143–150 (Oct. 23–24, 1995).

Warrier, U.S., et al., "A Platform for Heterogeneous Interconnection Network Management", *IEEE Journal on Selected Areas in Communications*, 8, 119–126 (Jan. 1990).

Smith, R.E., "Constructing a High Assurance Mail Guard", Proceedings of the 17th National Computer Security Conference, pp. 247–253 (Oct. 1994).

"Special Report: Secure Computing Corporation and Network Security", *Computer Select*, 13 p. (Dec. 1995).

Atkinson, R., "IP Authentication Header", Network Working Group, Request For Comment No. 1826, http//ds.internic.net/rfc/rfc1826.txt, 11 p. (Aug. 1995).

Atkinson, R., "IP Encapsulating Security Payload (ESP)", Network Working Group, Request For Comment No. 1827, http//ds.internic.net/rfc/rfc1827.txt, 12 p. (Aug. 1995).

Atkinson, R., "Security Architecture for the Internet Protocol", Network Working Group, Reqest for Comment No. 1825, http//ds.internic.net/rfc/rfc1825.txt, 21 p. (Aug. 1995).

Gassman, B., "Internet Security, and Firewalls Protection on the Internet", *IEEE*, 93–107 (1996).

Greenwald, M., et al., "Designing an Academic Firewall: Policy, Practice, and Experience with Surf", *IEEE*, 79–92 (1996).

Karn, P., et al., "The ESP DES–CBC Transform", Network Working Group, Request for Comment No. 1829, 9 p. (Aug. 1995).

Lampson, B.W., et al., "Dynamic Protection Structures", *AFIPS Conference Proceedings*, 35, 1969 Fall Joint Computer Conference, Las Vegas, NV, 27–38 (Nov. 18–20, 1969).

McCarthy, S.P., "Hey Hackers! Secure Computing Says You Can't Break into This Telnet Site", *Computer Select*, 2 p. (Dec. 1995).

Metzger, P., et al., "IP Authentication Using Keyed MD5", Network Working Group, Request for Comments No. 1828, http//ds.internic.net/rfc/rfc1828.txt, 5 p. (Aug. 1995).

Peterson, L.L., et al., *Computer Networks*, Morgan Kaufmann Publishers, Inc., San Francisco, CA, pp. 218–221, 284–286 (1996).

Schroeder, M.D., et al., "A Hardware Architecture for Implementing Protection Rings", *Communications of the ACM*, 15, 157–170 (Mar. 1972).

Stempel, S., "IpAccess—An Internet Service Access System for Firewall Installations", *IEEE*, 31–41 (1995).

Stevens, C., "Automating the Creation of Information Filters", *Communications of the ACM*, 35, 48 (Dec. 1992).

White, L.J., et al., "A Firewall Concept for Both Control–Flow and Data–Flow in Regression Integration Testing", *IEEE*, 262–271 (1992).

Wolfe, A., "Honeywell Builds Hardware for Computer Security", *Electronics*, 14–15 (Sep. 2, 1985).

begin_rules

\#

\#

\# This defines a filter policy for e-mail sent from the source network

\# to the destination network. The networks are named using values

\# from burb.conf. There may only be one entry for any source/

\# destination pair. The map name is a name of a filter map that is

\# built using the administration tool.

\#

\# filter_flow(source_network dest_network map_name) ~10
             12 end_rules

FIG. 1

910~ filter: KeyWord | Binary | Random | Size
920~ terminal: Audit | Deliver | LogToFile | ReturnToSender |
930~ MailToReviewer modifier: GenericRejectReason id: { user entered identifier } user_filter_id: id user_modifier_id: id user_terminal_id: id conf_info: conf_path   conf_token conf_terminal: terminal   conf_info   user_terminal_id conf_modifier: modifier   conf_info   user_modifier_id conf_filter: filter conf_info   user_filter_id configured_object: conf_terminal | conf_modifier | conf_filter drain_list: { list of one or more drains } pass_drain_list: drain_list reject_drain_list: drain_list drain_id: id drain_terminal: user_terminal_id   drain_id drain_modifier: user_modifier_id   pass_drain_list   drain_id drain_filter: user_filter_id   pass_drain_list   reject_drain_list   drain_id drain: drain_terminal | drain_modifier | drain_filter burb: { valid burb name or number } source_burb: burb dest_burb: burb flow: source_burb   dest_burb   ( drain_id | user_terminal_id )

FIG. 9

SYSTEM AND METHOD OF ELECTRONIC MAIL FILTERING USING INTERCONNECTED NODES

BACKGROUND OF THE INVENTION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

1. Field of the Invention

The present invention relates to computer security, and more particularly, to an apparatus and method for managing electronic mail message processing.

2. Background Information

Electronic mail is becoming a more integral means of communication for everything from students exchanging messages with each other and their teachers to highly sensitive business and governmental communications. Communication technology has expanded to where anyone with a personal computer, minimal software and a modem can connect to the Internet and send mail to any other computer, whether it is across the street or around the world. Because anyone can send mail to anyone else, many sites have begun establishing security policies which specify how mail sent to and received from external locations should be handled. These sites use mail messsaging systems to analyze incoming and outgoing messages and determine whether information concerning the message should be recorded or reviewed, or whether the message should be allowed to be delivered at all.

Every customer has different needs. Commercial security policy different for different business types and installations, and different from government and educational institution needs. To date, however, conventional systems have implicit assumptions about the security to be enforced built in, based on the rules of the security policy to be enforced. Thus, where a site is big enough to have departments with different needs, or where one filter is being developed for a number of clients, either a separate system must be developed and installed for each site/department, or the system must be written to enforce the lowest common denominator of the rules specified by each site/department.

In addition, systems constructed to date often require an independent computer system located such that all mail passing between external and internal locations passes through the filter system. Such systems typically are limited to looking for a specified set of keywords, making processing decisions based on whether the keyword is present or missing, depending on the rule.

Finally, conventional systems provided to date are only capable of a yes/no decision, providing only one option at each decision point. The message (or response to the message) must go down only one path—forwarded to the destination, returned to the source, or rerouted to a different destination. What is needed is functionality supporting multiple addresses for a single message. It is therefore difficult to implement a policy of, for example, forwarding questionable messages on to their original destination but also forwarding a copy to an internal auditor or logging system. Conventional systems cannot support this requirement.

What is needed is a way of structuring an electronic mail messaging system that is flexible enough to implement a variety of security policies but which is also simple for a network administrator to configure. Such a system would preferably provide multiple routing paths form each decision point.

SUMMARY OF THE INVENTION

The primary object of the present invention is to eliminate the aforementioned drawbacks of the prior art.

What is provided is a generalized, modular system for building mail filter flows. The filter system of the present invention is policy neutral—any one flow enforcing a particular security policy is constructed where necessary. The same components can be rearranged to enforce a different policy without reprogamming any of the individual modules.

According to one embodiment, a method of filtering electronic mail messages is provided, comprising the steps of determining which messages to filter, receiving a message, analyzing whether it meets the filter criteria, and forwarding the message to the filter if it meets the filter criteria and delivering the message if it does not meet the criteria.

In a further embodiment, the filter delivers the electronic mail message to its intended destination. In an alternative embodiment the filter analyzes the electronic mail message, and based on its characteristics either delivering or rejecting the message. According to a further embodiment the filter generates an audit message in conjunction with the results of the analysis.

Another embodiment comprises an electronic mail filter which comprises circuitry for receiving an electronic mail message, circuitry for analyzing the mail message using one or more individual filter nodes, and circuitry for generating a plurality of output messages. In one embodiment each filter node is one of a filter, a modifier, or a terminal. In another embodiment the electronic mail filter further comprises a graphical user interface for creating and maintaining the electronic mail filter.

BRIEF DESCRIPTION OF THE DRAWINGS

FIG. 1 shows one example of a flow configuration.

FIG. 9 presents an example of the specification of a filter flow using the flow language.

DETAILED DESCRIPTION OF THE PREFERRED EMBODIMENTS

Figure 2:
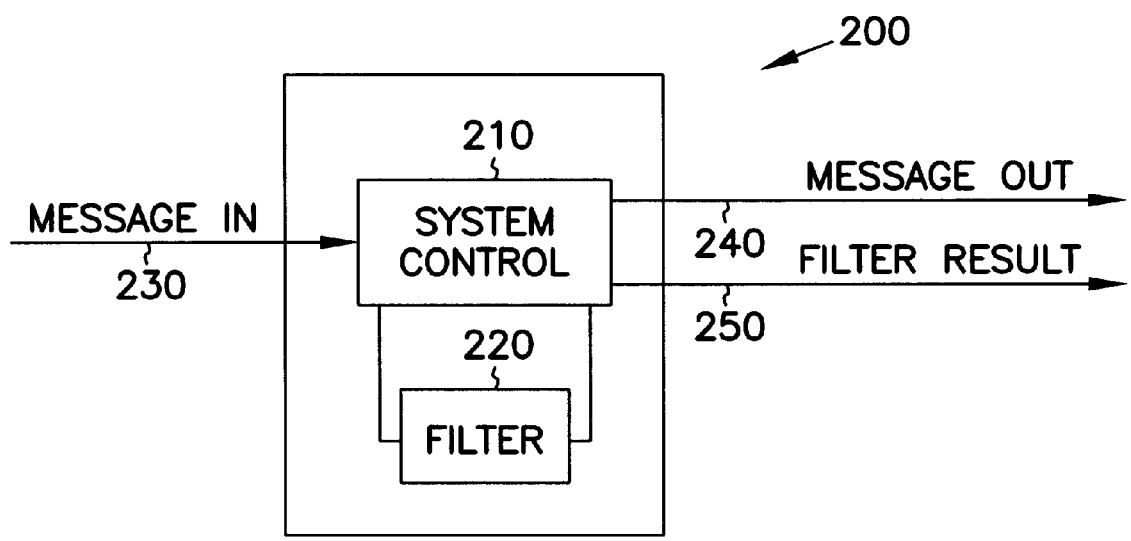
FIG. 2 is a block diagram showing one embodiment of a mail filter incorporated into a mail framework.

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

There are two aspects of mail filtering. First is what to filter, the second how to filter it. The first question is answered by one embodiment of the present invention in the "mail filter policy" file. This simply lists "burb" pairs which should be filtered. A burb refers to one protocol stack in an environment providing network separation by keeping separate protocol stacks or regions for each side of the system. A more detailed description of burbs is given in "System and Method for Achieving Network Separation", U.S. patent application Ser. No. 08/599232 filed Feb. 9, 1996 by Gooderum et al., the discussion of which is hereby incorporated by reference. Gooderum et al. teaches a separate protocol stack approach which gives a very clear split of the regions. The general structure of the design described by Gooderum et al. involves duplicating all of the protocol stacks where each stack is independent of the others. The routing to a given stack is done at the very top or bottom of the dataflow so that a given packet, piece of data, control message, etc. is bound to a particular stack at creation.

The mail filter policy file is used by a mail delivery agent to determine whether to pass mail on to the next burb or to drop it into a queue. Listed burb pairs are filtered and unlisted pairs are relayed to the destination burb. This file is read by the a mail queuing program for each delivery, so it is kept deliberately minimal to reduce overhead. The filter policy is described in greater detail below.

The second question, how to filter mail messages, is relevant to the programs which run the mail queues. These are long running daemons, so it is not a problem if they have some additional startup overhead. Filter configuration is also discussed in greater detail below.

The flow configuration is in a file and comprises a simple listing of burb pairs and a map name. This is configurable by the mail administrator and the system administrator under the operational kernel. This file must exist at installation time and be added if a system is upgraded. Initially no flows will be listed, but may be added at any time by the administrator. If the file is missing, the mail queue program will not deliver mail and will return an error to the sendmail application that invoked it. The convention for keeping read-only skeleton files around should be adhered to for this file. An example of a flow configuration is shown in FIG. 1, where each filter flow line 10 maps a burb-pair to a map name 12.

In one embodiment, the filter parent daemon is a tiny program that creates a pid/lock file and then executes filter queue runner programs. Whenever one of the top level configuration files is altered, this process should be signaled. It will then signal or restart its children as appropriate.

A program responsible for queuing mail will be a run by sendmail with source and destination burb parameters on the command line. The queuing agent will be a gate executable. Its effective domain (mque) will permit it to write the file into the queue directory. By being a gate, it will be able to check the real domain, which will be that of the parent sendmail process. It will check that the source burb parameter matches the sendmail source burb. If they disagree, then there is a configuration error or sendmail has been subverted. In either case the queue agent will audit and exit. If there are no startup problems, the queue agent will receive the message via SMTP over stdin/stdout. SMTP support will be the minimal necessary to receive the message from a properly configured sendmail process on the local system.

A long-running daemon is responsible for processing the mail for a given flow. The daemon is controlled by the filter parent. It does not read the policy file, but rather just looks at its command line for the burbs to use (for sender and recipient), the map file to use, and the queue directory in which to function. In one embodiment, the command line is formatted in the following manner.

/usr/libexec/mfil_queue_runner<src_burb> <dest_burb> <queue_dir> <map_file>[-d "high"|"low"]

Filter configuration needs to be as flexible as possible so as to allow future growth. This is good, however, because filter configuration can become one of those features with many facets that are visual and easy for non-technical people to understand. Filter administration starts with a configuration file which identifies filter components, how they are chained together, and where the configuration information for each instance is located. Components consist are one of three types: terminal output modules, data modifiers and filtering modules.

Figure 3:
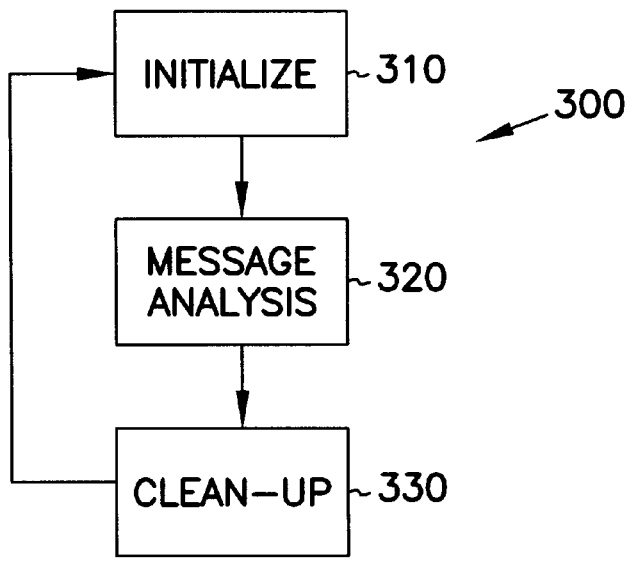
FIG. 3 shows the main components of a mail filter node according to one embodiment of the present invention.

The electronic mail system, or "mail framework", is a collection of independent objects or "nodes" which can be arranged into one or more filter flows (or filters) to describe/enforce any security policy. FIG. 2 is a block diagram showing one embodiment of such a filter 220 incorporated into mail framework 200. Filter 220 can be expressed as an interconnected series of nodes. In one embodiment, there are three general node types: a filter, a modifier, and a terminal. The node types are described in greater detail below. Each node in filter 220 comprises three components: initialization, message processing, and node clean-up. According to one embodiment, shown in FIG. 3, each node is composed of three basic sections 310, 320, 330 which all exist within the same process. Each section provides a distinct set of functions. Initialization module 310 provides the initialization functions, including loading a configuration file which contains any configurable settings for the node. Examples of various configuration files are presented later in the discussion of each node type. Message analysis module 320 provides the operational functions of the node. These functions may include receiving the message, applying the filtering algorithm to the message, and preparing and transmitting the results of the node's processing. Clean-up module 330 comprises functions which clean up and shut down the node when it ceases processing. These functions ensure that the system within which the node is executing is left in a good state. This provides a well-defined boundary between any two nodes, ensuring maximum security.

Figure 4:
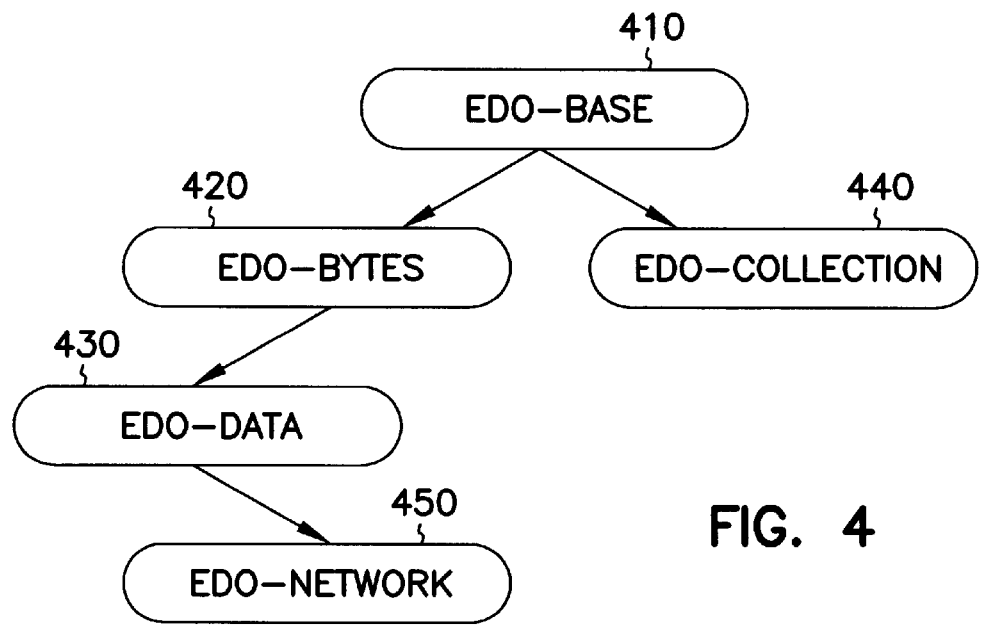
FIG. 4 is a graphical representation of an extensible data object tree.

Mail framework 200 is intended to support the development of a mix-and-match set of filters which can be chained together according to the whim of the administrator. At the same time, the data structures must be flexible and expressive so that sophisticated filters may be constructed. In one embodiment, the implementation is further constrained, using C rather than a more expressive language like C++ or Sather, in order to achieve greater processing speed. The extensible data structure (edo) shown in FIG. 4 is an attempt to create such a data structure. The edo essentially creates a shallow class hierarchy with a common base class and simple up/down casting.

An edo is a standardized simple data structure with certain guaranteed features which can be expanded upon for application-specific uses. A base set of edos are always available and are suitable for simple text or byte data filters. More sophisticated filters may be constructed to use specialized edos with extra application-specific information.

The type edo-t is, conceptually, an abstract base class. It provides the common interface to all of the edo data structures. FIG. 4 shows the conceptual class hierarchy. The first field of the edo base 410, embodying the edo_t type, is an enumerated integer value indicating the data type. All edos must have the same three fields at the start of the structure. This group of fields may be partially interpreted as a bit mask. Bit one is compatible with edo-bytes, and is set if it is a "byte bucket". The bit mask interpretation is not entirely consistent with respect to casting, due to the limitations of trying to do this in the C programming language. The second field of the edo base is a state field which is filled in by the filtering functions. The state field indicates whether the edo has been rejected by a previous filter. Other bits indicate if the edo was deemed suspicious or if it was edited by a filter. Neither the suspicious or edited states are exclusive of the bucket being considered 'okay' or 'rejected'. A bit mask can be used to pull out the pieces considered important for filter or modifier node processing. Filter and modifier nodes may ignore the state field or skip processing rejected data nodes, depending on their purpose. The third field of any edo node is a pointer to a "copy constructor". This is a function that can duplicate the node, given a pointer to itself. The forth field is a pointer to a "destructor" function which can delete the node and free up all dynamically allocated memory. Convenience macros are provided for calling these member functions. As an example, for a given edo 'e', these would be invoked as:

copy_edo (e);

and delete_edo (e);

The bytes edo 420 section is a simple "bucket of bytes" suitable for many filtering operations. It is a dynamically allocated array of bytes which may be searched and added to by filter or modifier nodes. This is where the actual message is located. A filter or modifier node which alters the data is permitted to use standard system calls (such as 'realloc()') to resize bytes edo array 420 if needed.

The data edo 430 section is a metadata section which allows annotation and additional data to be added to the original message. It is a byte bucket with a collection of edos which may be searched and added to by filter or modifier nodes. Data edo 430 is derived from a bytes edo 420, and contains the annotations appended by the filter or modifier nodes. Such annotations may include information which carries parsed data (which, for example, identifies the message sender or recipient), or perhaps the rejection reason if the message failed a filter. Filter or modifier nodes knowledgeable of the various types of optional data (which are also represented as edos) may draw on this knowledge for additional context. Simpler filters can ignore the collection and may even process an data edo section 430 as a bytes edo section 420, which is effectively its base class.

The network edo 450 is a data EDO with some additional context describing the data which is being operated on by the filter or modifier node. It includes the source and destination address of the data. Both, one, or neither of the addresses may be an address of the machine on which the mail framework resides, depending on where the client and server processes are located. This information is obtained from the socket which was the source of the data (getpeername(), getsockname()). Indexes for other physical and logical portions are also included with the address. Use of the extra information in network edo 450 may provide for better filtering, but not all data sources will be associated with a network. In addition, electronic mail filtering may be also done on files rather than on network connections.

The collection EDO 440 is derived from the base EDO 410, to which it adds pointers to three additional functions. These functions provide a simple random access data structure for storing edo pointers and indexing them by keyword. One function will add an (edo, keyword) pair (tuple) to the collection. Keywords must be unique within a collection. The second function will find an edo in the collection based on the keyword, and the third function will remove an edo from the collection, based an the keyword. An edo collection is used as a field in the data and network edo types 430, 450. The anticipated use of the edo collection 440 is as a means for carrying a set of annotations along with the data portion of a message. For example, one filter might parse out the headers from an electronic mail message. Other filters could then look up the headers in the annotation and could grade the headers without being smart enough to parse them from the rest of the message. This supports using filter sequences for a stream processing-based programming paradigm.

The binary filter expects the entire content of the message to be contained within the Bytes 410 section of the EDO 400. The actual binary filter is called once for each EDO Bytes section 410. The entire contents of the Bytes section 410 is treated as a single message by the binary filter. This approach cannot guarantee that any specific e-mail message will be caught, but will, however, catch the widest variety of violators with a single algorithm. This generalized approach improves over conventional systems in other aspects as well. Since the binary filter approach is not format-specific it is much more difficult to break. Format-specific systems follow the rules of the format and thus it is much easier to avoid detection by imitating the format. In addition, file formats not previously encountered are still likely to be detected in a binary filter system.

The programming interface also identifies the range of node behaviors. In one embodiment, it is the programming interface which enforces the one input, one/two output rule followed by every filter node. This rule is strictly enforced in order to maintain the rigor of the system. Such an approach does not, however, limit the functionality of the system appreciably. If a more complex decision tree is required to enforce a particular rule, the tree can be constructed by chaining a series of modules. This is preferable over building complex nodes for two reasons. One is because the individual nodes retain their independence and remain policy-neutral. The other is because the flow is easier to maintain and modify in the case of future policy changes. It is the programming interface which also supports the feature that any one output can be directed to one or more inputs. The programming interface is implemented in the C++ programming language, but the filter nodes can be implemented in C. The edo data structure described above enables the flexibility in the filter nodes which would otherwise be unavailable in a procedure written in C.

All of the nodes allow additional interactions with applications external to the mail system for other than mail processing functions. For example, a filter node may read initialization data from an external file, or write a message to a log or audit file. The input/output limitations imposed by the programming interface apply only to the direct interactions between filter nodes.

Mail Filter nodes are made operational in one of three ways. In one embodiment, the nodes are all compiled into a single library. In this embodiment when an node is called the subroutine in the library is executed. This is the best-performing form. However, it creates some security issues because all of the nodes are in the same library. To better secure the mail filter system the nodes can each be compiled individually. This form loses some performance speed, because each filter node module is brought into memory when it is called, rather than having all of them in memory after the system is initialize. However, separation is maximized, providing the best protection against being able to attack one module via a less-protected module. The third embodiment is a compromise between the two previously described. In this embodiment a shell for each filter node is compiled into a common library, but instead of the library subroutine executing the filter module code, it calls an external program. This gives back some of the speed lost when the modules are completely independent, without completely sacrificing the concept of isolating the modules.

The mail filter framework of the present invention does not completely handle mail in different formats. The same programming interface code can be used for the structure underlying filter flows for different formats. In another embodiment, a common mail filter system may be used as a preprocessing step to enable common processing. In this embodiment the filter flow(s) are used to identify which part of the message to use, and/or to direct the message to the proper application for further processing. This limitation is acceptable, because it is desirable to stay with a configurable signal which can be universally used. If the signal is made aware of a specific protocol (for example, SMTP, X.400, etc.), the mail filter system is implicitly unable to process other protocols.

Figure 5:
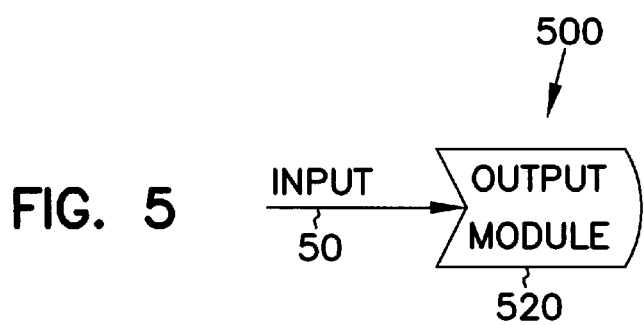
FIG. 5 shows a simple example of a terminal output module.
Figure 6:
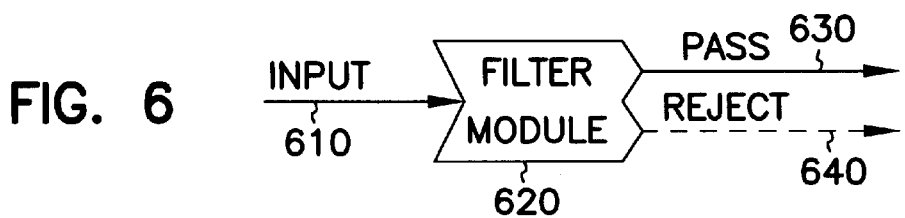
FIG. 6 shows an example of a filter module.

Filtering modules accept one input and generate two outputs. One output is the input edo, possibly with modifications. This output is directed to the next module based on the edo's filter-filter result field. A filtering module is visualized as having two outputs, one for PASSed edos and one for REJECTed edos, each of which may be separately routed to other components. FIG. 5 shows an example of a terminal output module 500 and FIG. 6 shows an example of a filtering module 600. A filter node accepts the input as representing a complete entity. Filter components may be combined to form a compound object, which may then be used as a filter module or a terminal output module.

Figure 7:
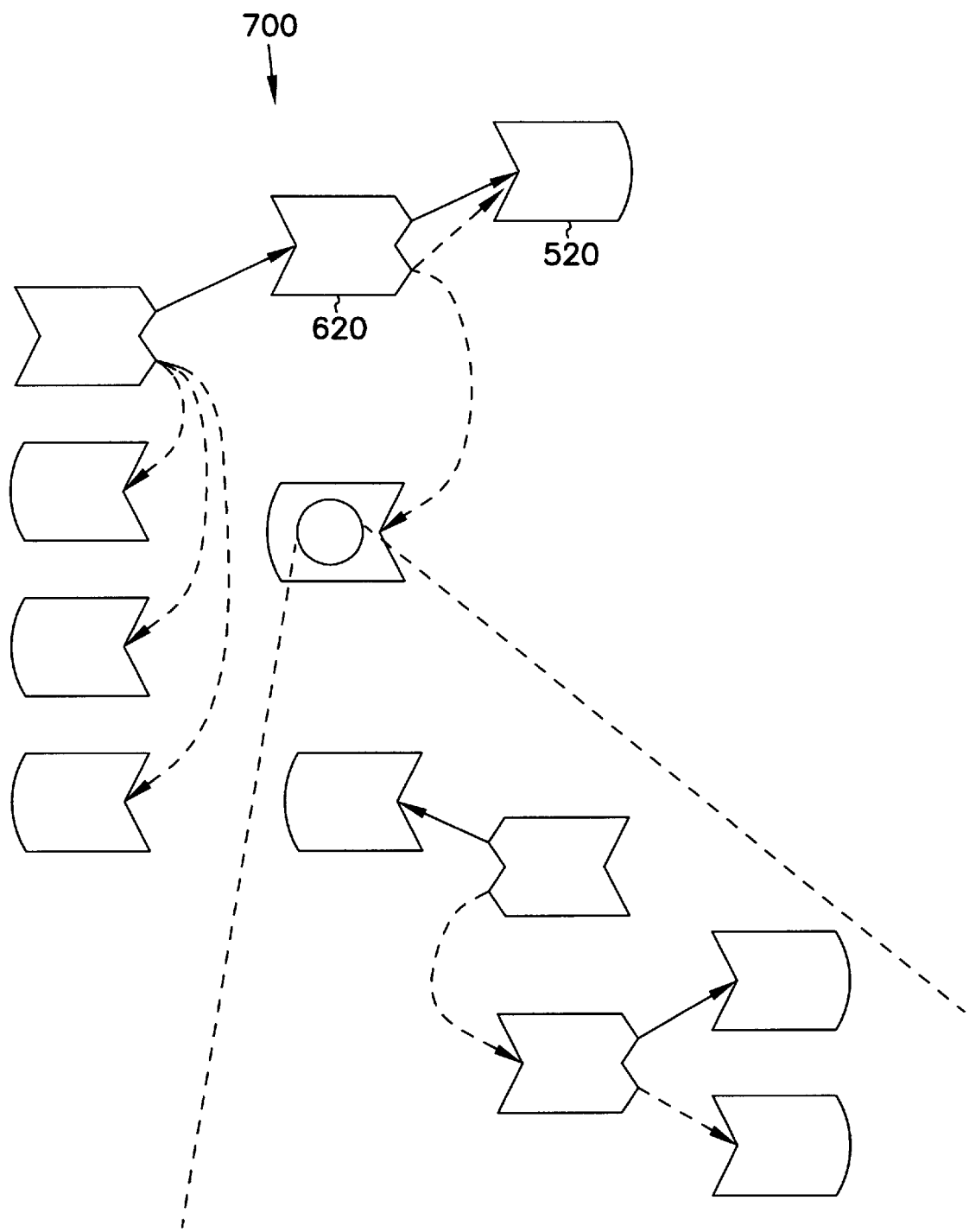
FIG. 7 shows an example of how components may be wired together to create a filter flow in the mail framework of the present invention.

The configuration file is meant to be very flexible and extensible. The queue runner programs should be able to accommodate this. It is desirable, but not required to make this flexibility available to the user. FIG. 7 shows an example of how components may be wired together to create a filter flow in the mail framework of the present invention. The graphical user interface (GUI) should take inspiration from programs like LabView®, Khoros®, IRIS® Explorer™, AVS® and the like. Examples of these products are available on the Internet at the following URLs:

| | |
|---|---|
| Khoros screen shot: | http://www.khoros.unm.edu/khoros/screen.jpg |
| general information on Khoros: | http://www.khoros.unm.edu/khoros/khoros2/home.html |
| AVS screen shot: | http://www.avs.com/products/rem_sense2.gif |
| general information on AVS: | http://www.avs.com/ |

Figure 8A:
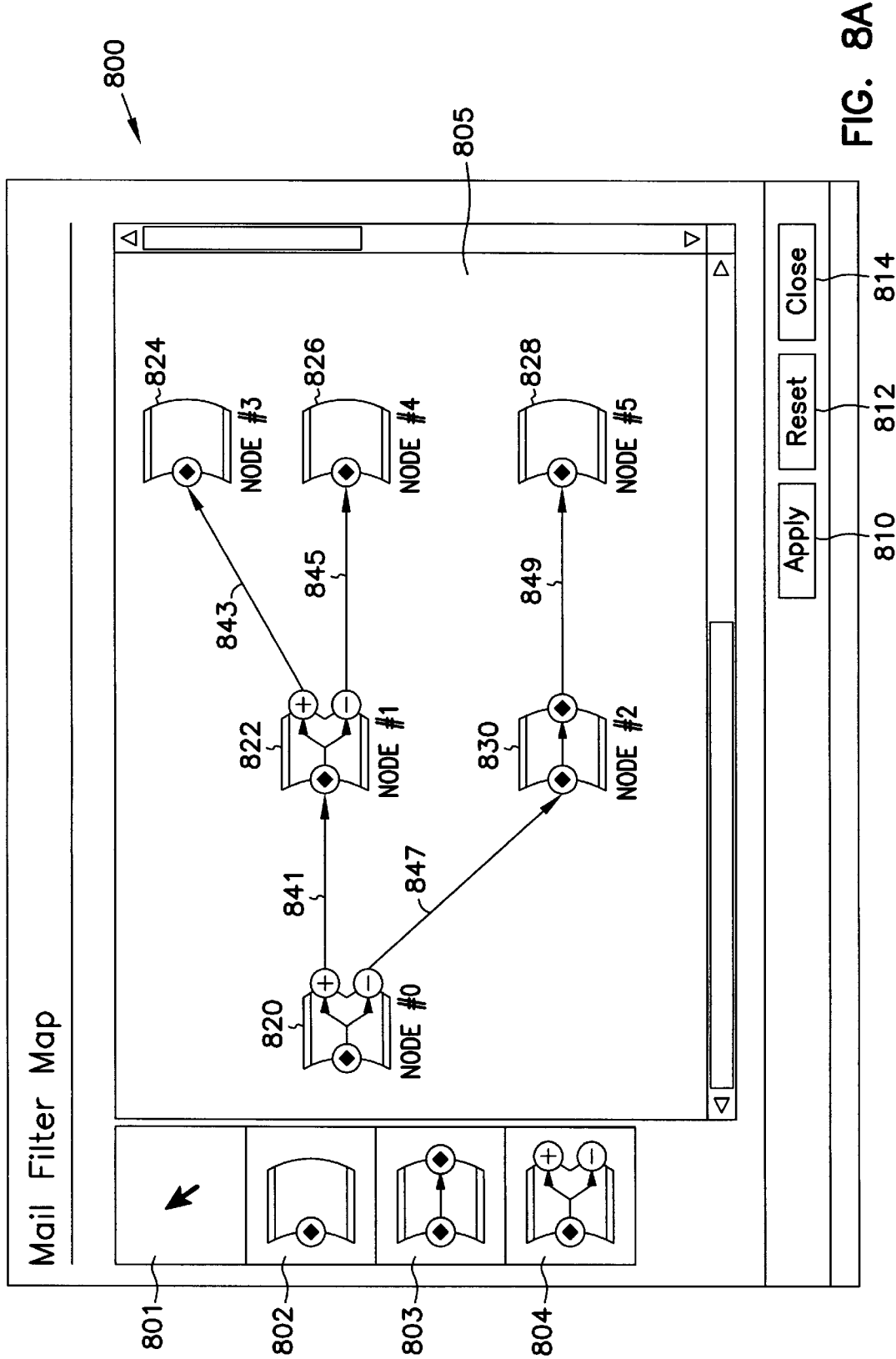
FIG. 8A is a representation of the mail filter map maintenance window presented by the user interface.
Figure 8B:
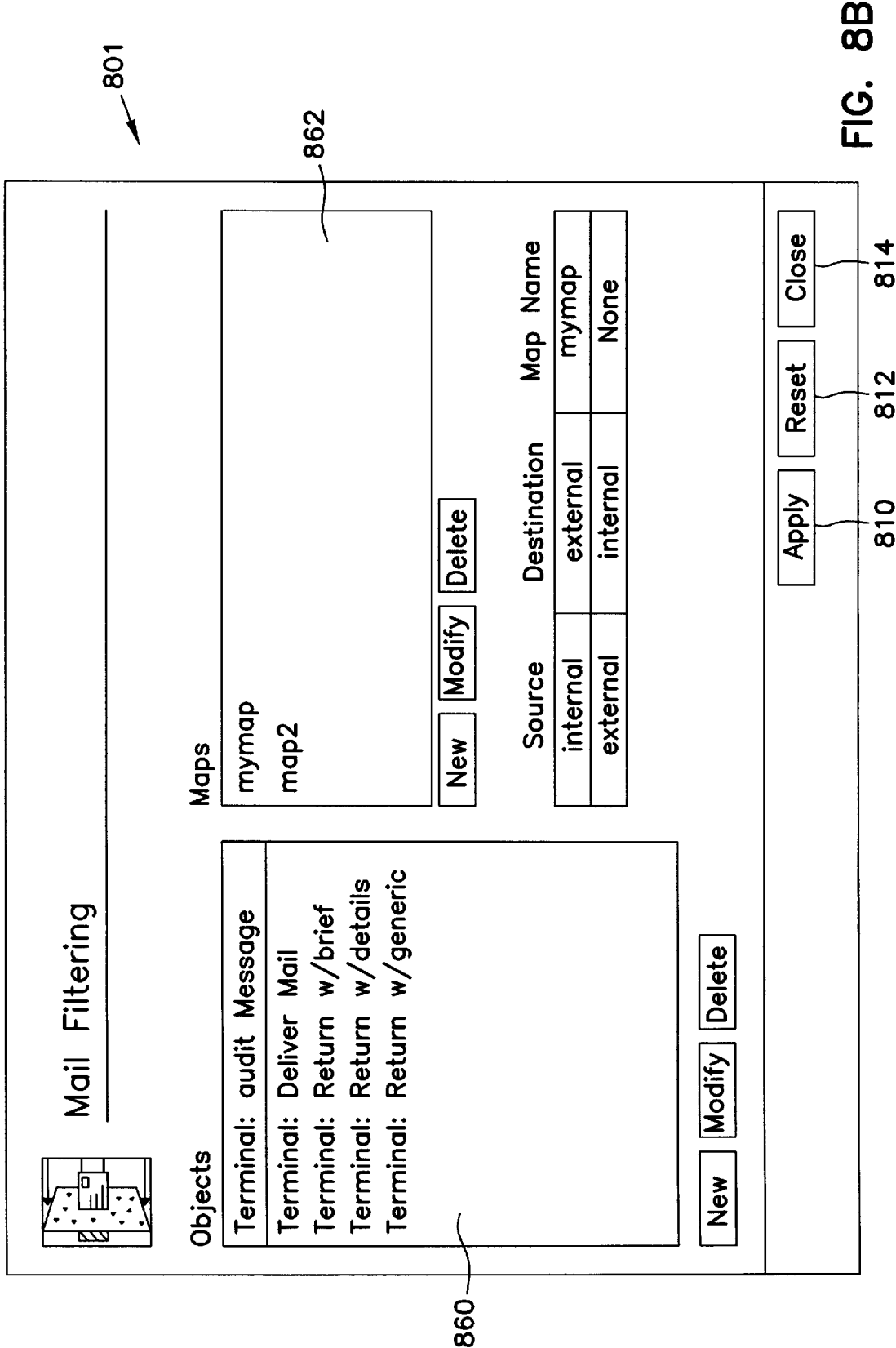
FIG. 8B is a representation of option windows presented by the user interface.

Another embodiment of the present invention comprises a graphic interface for constructing and maintaining mail flows within the mail framework. FIG. 8A is a representation of one embodiment of the flow editing screen 800. The flow editing screen includes a pick list of the node types (connector 801, terminal 802, modifier 803, and filter 804) available to include in the filter flows, and a window or "canvas" 805 for graphically constructing each filter flow. The administrator selects one or more filter nodes 802–804 and locates them on canvas 805 in the order in which messages are to be processed. The nodes are then connected using the connector icon 801 to show the channels 841, 843, 845, 847, 849 for the input and output(s) for each node. An additional menu window, shown in FIG. 8B, provides, for example, a window for defining and maintaining individual nodes 860 and filter maps 862. Each node is given a unique name, and its characteristics (such as how it processed each input message) are defined or modified using these menus and windows 801.

References in the description of the mail framework of the present invention imply assumptions about how the information will be displayed and manipulated. These are not to be interpreted as requirements, but rather as a reflection of one embodiment of how mail framework is implemented and of the associated interfaces.

A filter flow is build up in a simple language. It consists of simple object types, configurations of those types, aggregate objects and objects that form associations between other objects. In the actual implementation this is all represented in a configuration file, but at this point it will be described at a more abstract level.

Some of the objects (or their identifiers) described here will be directly visible and manipulated by the administrator through the GUI. Other objects which are less directly visible are manipulated via a graphical metaphor and are created and destroyed on the fly by the GUI, as needed, to organize the objects. The visual program that is built up out of these objects may be referred to as a map.

All visible objects in a GUI map editor are "drains". Drain objects, and their identifiers, are created dynamically (except configured terminals, which can be used as-is) when the user selects a configured object and drags it onto the canvas. As the system expands, there will be more kinds of filters, modifiers and terminals, but the underlying logical structure should not change. The GUI is designed such that it can be expanded to support configuring instances of new primitives, but will it will support programming the new primitives into a new map without any changes.

Figure 10:
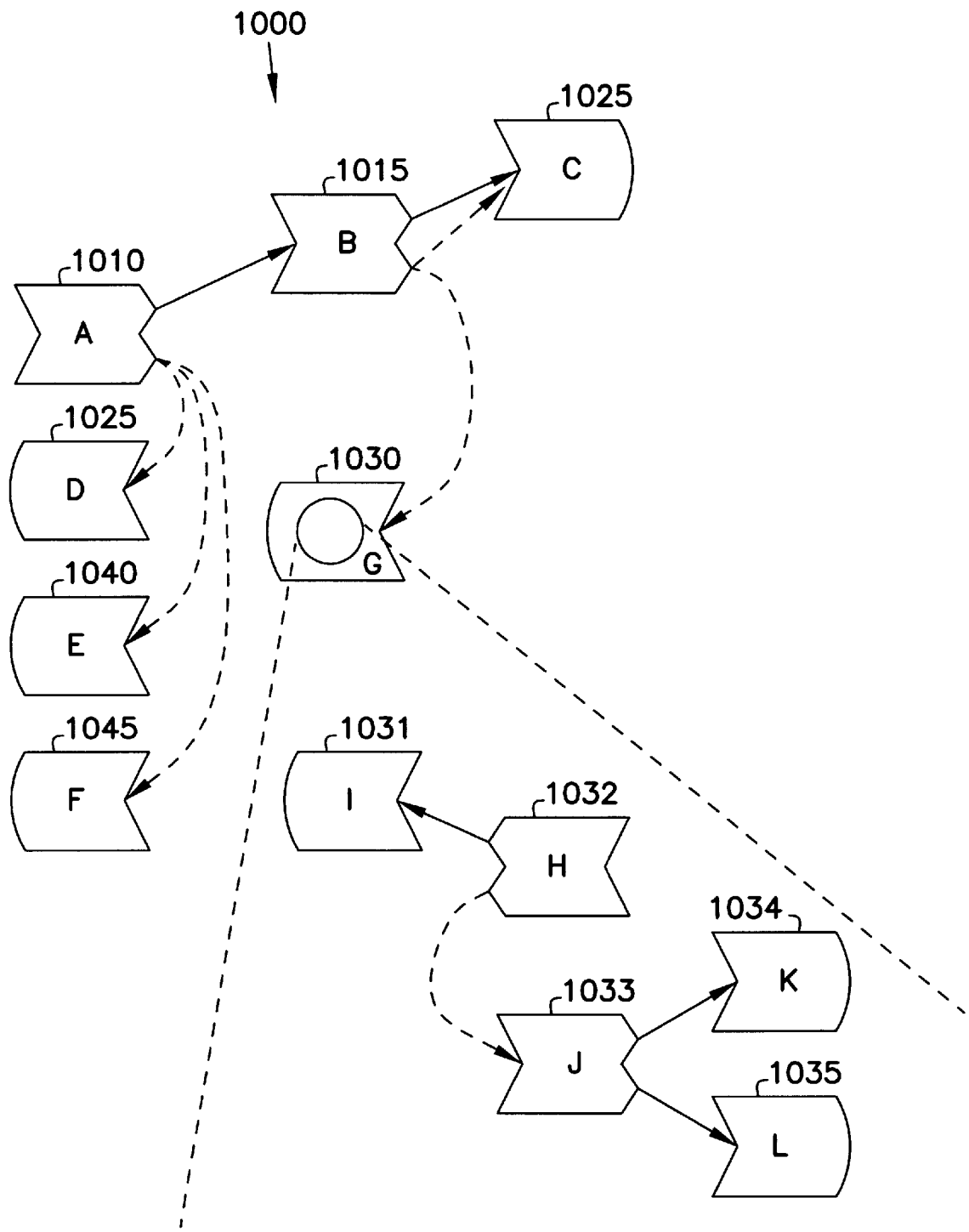
FIG. 10 is a graphic representation of sample flow rules.

FIG. 9 presents an example of the specification of a filter flow using the flow language. The specification includes such information as the available node types 910, 920, 930. In practice a filter flow specification is written with syntax consistent with the configuration file formats used by the system upon which the mail structure is operating. Table 1, below, shows the sample flow rules graphically presented in FIG. 10.

TABLE 1

Sample Flow Rules

| node | statement |
|---|---|
| L | user_terminal_id |
| K | user_terminal_id |
| J | drain_filter (user_filter_id, [K], [L]) |
| I | user_terminal_id |
| H | drain_filter (user_filter_id, [I], [J]) |
| G | drain_list (H) |
| F | user_terminal_id |
| E | user_terminal_id |
| D | user_terminal_id |
| C | user_terminal_id |
| B | drain_filter (user_filter_id, [C], [C,G]) |
| A | drain_filter (user_filter_id, [B], [D,E,F]) |

When trying to convert a graph into a symbolic representation, it is simplest to label all of the nodes and then work from the leaves up towards the root. For example, to convert FIG. 7 we would first label the figure, as in FIG. 10. Note that node G 1030 is really superfluous, and could be eliminated if one wanted to minimize the nodes. It is however, valid, and perhaps useful, to build the map up through layers. A message comes into node A 1010 which is a filter. If the message passes the filter it is forwarded on to node B 1015, which is also a filter. If the message fails node A 1010, an audit is forwarded to terminals D 1025, E 1040, and F 1045. If the message passes node B 1015 it is forwarded on to node C 1020, which is a terminal in this example. If the message fails filter B 1015, however, it is still forwarded to node C 1020. In addition, an audit is also forwarded to node G 1030, which in one embodiment is simply a terminal. In another embodiment node G 1030 is actually another filter flow. The audit received by node G 1030 comes into node H 1032, which is a filter. If the information comprising the audit passes the filter then information is forward to terminal node I 1031, otherwise an audit is forwarded to filter node J 1033. If the audit information passes that filter 1033, information is forwarded to terminal node K 1034. Otherwise, an audit is forwarded to terminal node L 1035. As this example shows, the various nodes can be combined to form filter flows of any level of complexity. The above examples are offered for illustration and are not intended to be exclusive or limiting.

Figure 11:
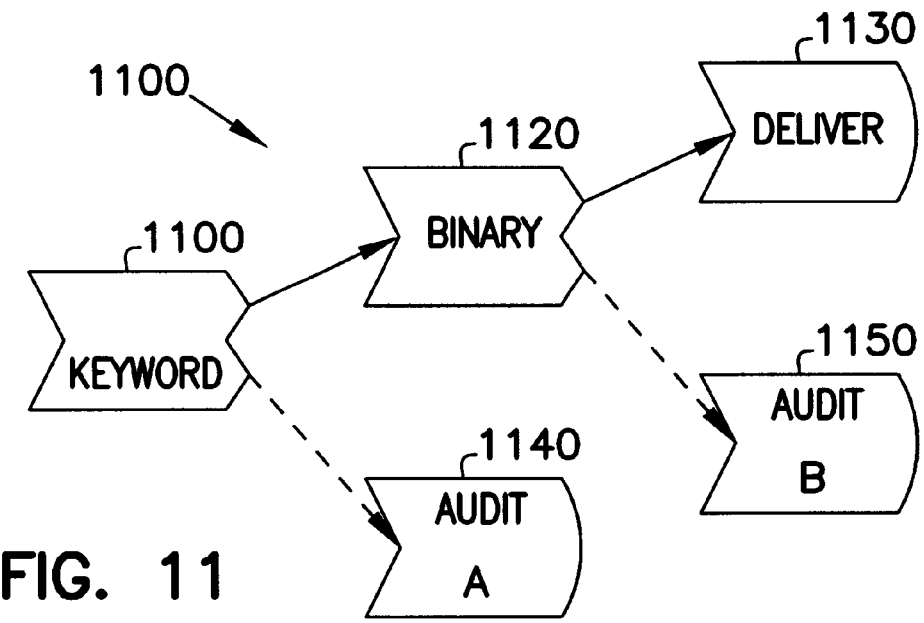
FIG. 11 illustrates a filter map where there is a separate auditor for each filter.

For a given message, each terminal in a map will only be activated once. This principle governs when audit messages are combined into a composite rejection message and when multiple notifications get sent to the same destination. Failures and rejection reasons do not carry forward through filters. FIG. 11 illustrates a filter map where there is a separate auditor for each filter. For the map shown in FIG. 11 rejections from the key word search filter 1110 will be sent to Auditor A 1140. Messages that pass the key word search filter 1110 will go to the binary filter 1120. Rejections from the binary filter 1120 will be sent to Auditor B 1150. Messages that pass the binary filter 1120 will be delivered 1130.

Figure 12:
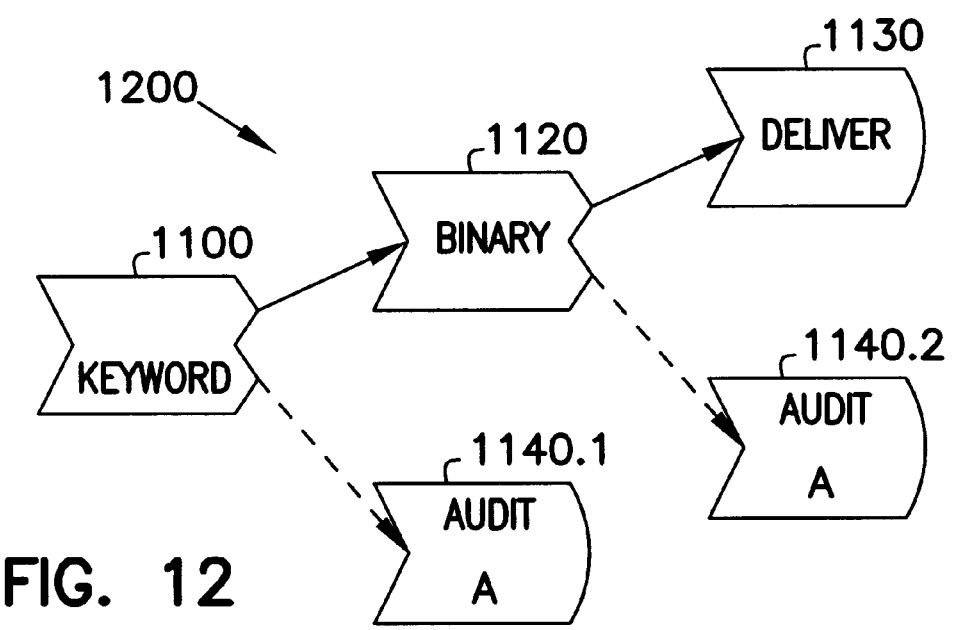
FIG. 12 illustrates a filter map where two different filters use the same auditor.
Figure 13:
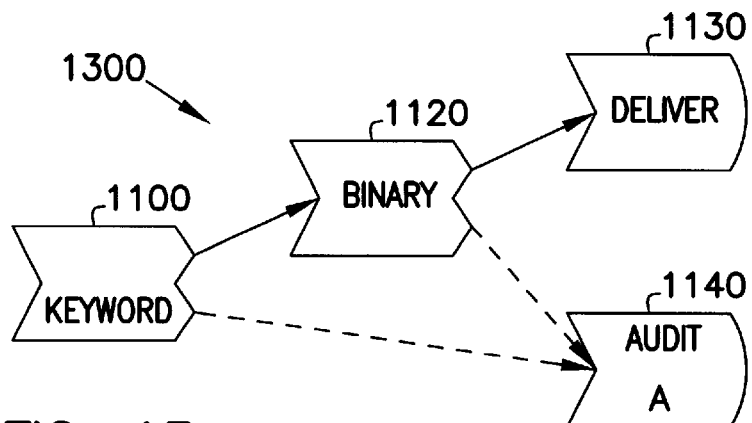
FIG. 13 shows an embodiment wherein rejections from multiple filters are sent to the same auditor via a single terminal.

FIG. 12 illustrates a filter map where two different filters use the same auditor. For the map in FIG. 12 rejections from the key word search filter 1110 will be sent to Auditor A 1140.1. Messages that pass the key word search filter 1110 will go to the binary filter 1120. Rejections from the binary filter 1120 will also be sent to Auditor A 1140.2. Messages that pass the binary filter 1120 will be delivered 1130. Note that auditor A nodes 1140.1 and 1140.2 are individual terminals which direct rejections to the same destination. FIG. 13 shows an embodiment wherein rejections from multiple filters 1110, 1120 are sent to the same auditor via a single terminal 1140. For the map in FIG. 13 rejections from the key word search filter 1110 will be sent to Auditor A 1140. Messages that pass the key word search filter 1110 will go to the binary filter 1120. Rejections from the binary filter 1120 will also be sent to Auditor A 1140. Messages that pass the binary filter 1120 will be delivered 1130. This effectively yields the same results as the map shown in FIG. 12. It should be noted that in order to yield exactly the same results a message passing through filter 1120 would have to carry with it the rejection message generated by filter 1110.

Figure 14:
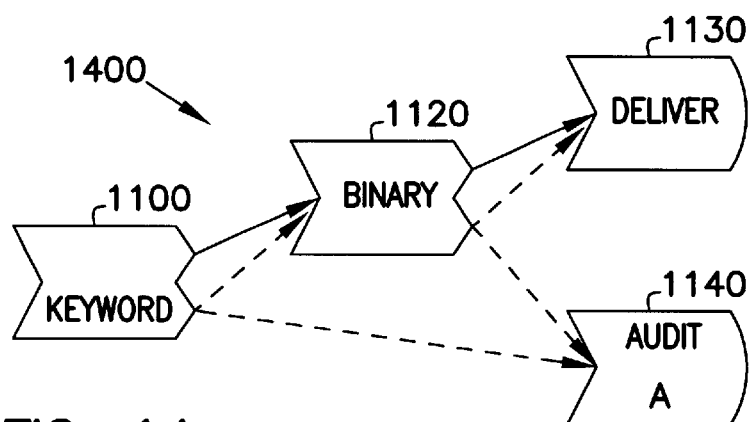
FIG. 14 shows an instance where rejects are passed forward and audits go to a shared auditor.

FIG. 14 shows an instance where rejects are passed forward and audits go to a shared auditor. According to the map in FIG. 14 rejections from the key word search 1110 and binary 1120 filters will be sent to Auditor A 1140. All messages will go to the binary filter 1120, regardless of whether they pass or fail the key word search filter 1110. If a message fails the key word search filter 1110 and the binary filter 1120, then a single notification will be sent, and it will include the rejection reasons from both filters. All messages will be delivered in this example.

Figure 15:
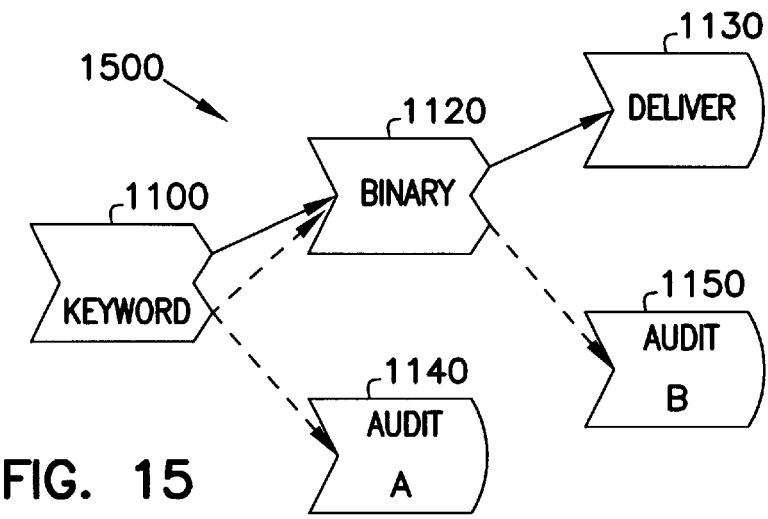
FIG. 15 shows an embodiment of a filter flow where separate auditors are used and rejects are passed forward.

In the example filter flow shown in FIG. 15, where separate auditors are used and rejects are passed forward, rejections from the key word search filter 1110 will be sent to Auditor A 1140. Rejections from the binary filter 1120 will be sent to Auditor B 1150. If a message fails the key word search filter 1110 and the binary filter 1120, two notifications will be sent. The one sent to Auditor B 1150 will only include the binary filter's 1120 rejection reason. The one sent to Auditor A 1140 will only include the key word search filter's 1110 rejection reason. A message must pass the binary filter 1120 to be delivered, but delivery does not depend on whether or not it passed the key word filter 1110.

Figure 16:
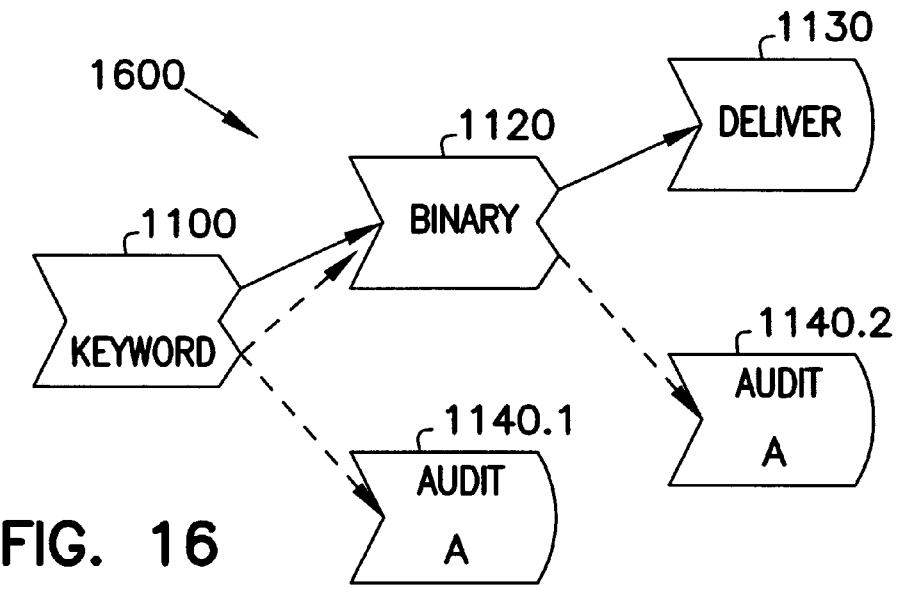
FIG. 16 illustrates a map example using the same auditor and passing rejects forward.

FIG. 16 illustrates a map example using duplicate auditors and passing rejects forward. For the map in 16 rejections from the key word search filter 1110 will be sent to Auditor A 1140.1. Rejections from the binary filter 1120 will also be sent to Auditor A 1140.2. If a message fails the key word search filter 1110 and the binary filter 1120, two separate notifications will be sent, each containing a single rejection reason. This is because there are separate terminals for sending the notifications to Auditor A. A message must pass the binary filter 1120 to be delivered, but delivery does not depend on whether or not it passed the key word filter 1110.

Figure 17:
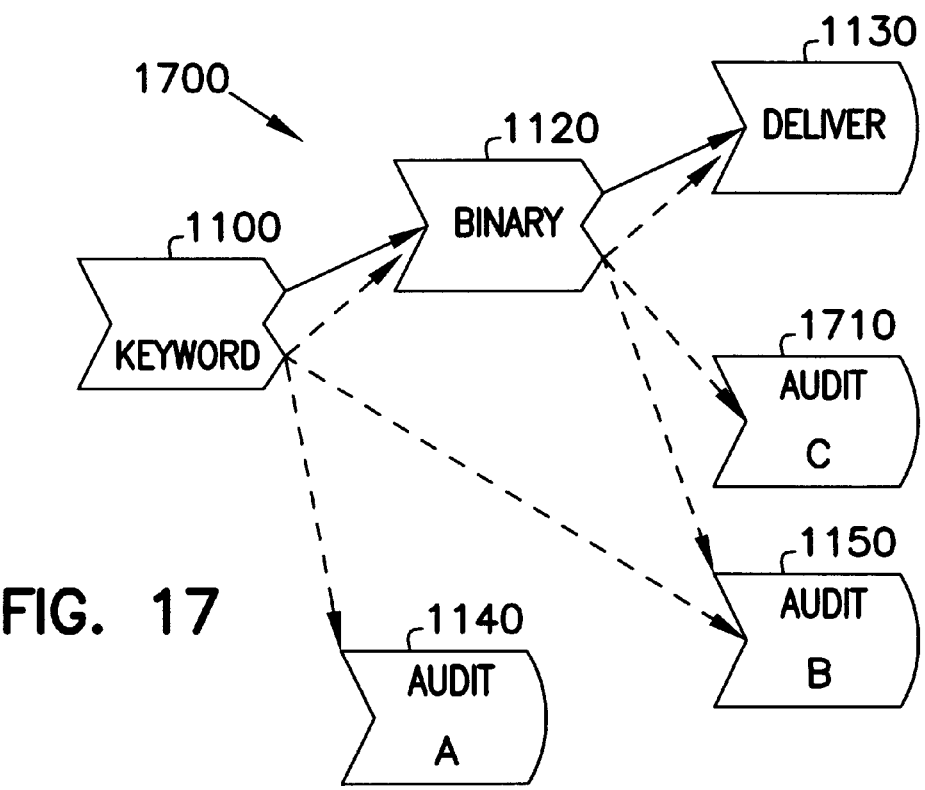
FIG. 17 shows a filter map combining the ideas presented in FIGS. 11–16.

The filter map shown in FIG. 17 is just a combination of the ideas presented above. Auditor A 1140 will only receive notifications for messages that fail the key word search filter 1110. Auditor B 1150 will receive notifications for messages that fail the key word search filter 1110, the binary filter 1120, or both. If a message fails both, Auditor B 1150 will receive a single notification that includes both rejection reasons. Auditor C 1710 will only receive notifications for messages that fail—the binary search filter 1120. Even if a message fails both, the notification that is sent to Auditor C 1710 will only include the binary filter's rejection reason. All messages will be delivered under this example.

Filter configuration is actually expressed by a simple language which is represented in the configuration file syntax of the system upon which the mail framework is executing. Appendix I contains an example of one embodiment of such a filter configuration file. The configuration is broken into three parts. The first part is the filter policy file described earlier. The second part is the filter configuration file which lists all of the parts which are used to assemble the filter policy diagrams (called maps). The configured parts and the file rules are described below. Finally, the third part is the map files. There is one map file per configured flow, as explained in more detail below.

First, a brief description of the primitives employed in one embodiment of the present invention. The terminal modules list in the Terminal[ ] entry are primitive objects that are listed so as to minimize the amount of knowledge that is hard-coded in the programming interface. Following is an example of filter configuration rules.

---
Filter Configuration Rules
---

```
begin_rules
        conf_info ( path token )
        conf_terminal ( terminal conf_info() conf_id )
        conf_modifier ( modifier conf_info() conf_id )
        conf_filter ( filter conf_info() conf_id )
end_rules
Terminal[ ]
Modifier[ ]
Filter[ ]
```

There may be only one Terminal[ ] entry in the configuration file. The modifier objects are listed in Modifier[ ]. These are primitive objects and are listed so as to minimize the amount of knowledge that is hard-coded into the programming interface. There may be only one Modifier[ ] entry in the configuration file. The third primitive is a filter. A filter list is a list of all of the types of filters that the system knows about. Putting the filter list in the configuration file lets the filter programming interface have as little hard-coded information as possible. As with the previously described primitives, there may be only one Filter[ ] entry in the configuration file.

Configuration information for terminals, modifiers and filters are all specified in the same way using the "conf_info" rule. This rule includes a path to a configuration file and a token. For simple items, the token alone may be sufficient. For others, the file may include everything and the token may not be used. If multiple items share a configuration file, then the file may be specified by the path and the token may indicate a specific entry in the file. If a token or path field is unused it must be set to the string "none". This means that "none" cannot be used as a valid value for either of these fields.

A configured terminal is given with the "conf_terminal" rule. This associates an identifier with the terminal type and this set of configuration information. For many terminals there will be no configurables, so they may be preconfigured and the user will not be able to configure additional ones. The Terminal field must contain a valid field from the Terminal[ ] list. A configured modifier is given with the "conf-modifier" rule. This associates an identifier with the modifier type and this set of configuration information. The Modifier field must contain a valid field from the Modifier[ ] list. A configured filter is given with the "configure filter" rule. This associates an identifier with the filter type and this set of configuration information. The Filter field must contain a valid field from the Filter[ ] list.

The"drain" objects are associations between a configured object and links to other drain objects. These objects define the links in the flow diagrams. A configured terminal is also regarded as a drain object since it is complete in isolation due to the lack of outputs. For complex objects, the output fields are lists of drain id's. Configured objects have id's that the user has entered and uses to identify the object. Drains have identifiers also, but, except for configured terminals, these identifiers serve a purely internal purpose and may be chosen in whatever manner suits the administration tools.

A drain list is a list of valid drain identifiers. This is simply an organizational object. A drain modifier is an association of a configured modifier with a list of output drains. This association is given a drain identifier so that it can be linked to the output of an upstream node. A drain filter is an association of a configured filter with a drain identifier (did). This association is given a drain identifier so that the drain filter can also be linked to the output of an upstream node. Finally, for any flow there must be a single entry for that source/destination burb pair. This entry contains the burb names and a single drain identifier. By default (and probably in the skeleton file) all of the standard flows should be configured to use the deliver drain object.

For each flow there is a configuration file that describes the flow. If a flow is in the policy file but there is no map, then mail will queue but not be processed. The map consists of associations of the configured filter objects shown in FIG. 19. In one embodiment map files are stored in a map subdirectory and are each individually named. For example, a map file may be named "kws_only.conf". In this case, the map name is "kws_only". Following are examples of a flow configuration file and a map configuration file.

---
Flow Configuration File
---

```
begin_rules

#       This associates the identifier of a configured terminal in filter.conf with a
#       drain identifier (did).

drain_terminal ( conf_id did )
```

```

#       This associates the identifier of a configured modifier in filter.conf with a drain
#       identifier (did). Output from the modifier will be sent to the objects listed by their
#       did's in the pass_drains[ ]list.

drain_modifier ( conf_id pass_drains[ ] did )

#       This associates the identifier of a configured modifier in filter.conf with a drain
#       identifier (did).
#       Messages that pass the filter will be sent to the objects listed by their did's in the
#       pass_drains[ ] list.
#       Messages that the filter rejects will be sent to the objects listed by their did's in the
#       reject_drains[ ] list.

drain_filter ( conf_id pass_drains[ ] reject_drains[ ] did )

#       This lists the drain identifier for the starting point for this map file. There may be
#       only one flow() entry in the file.

flow (did)
end_rules

#       This is a list of all of the drain identifiers (did's) that are valid in this file.
#       There may be only one drain_list[ ] entry in the file.
drain_list[ ]
                             Map Configuration File begin_rules
        drain_terminal ( conf_id did )
        drain_modifier ( conf_id pass_drains[ ] did )
        drain_filter ( conf_id pass_drains[ ] reject_drains[ ] did )
        flow (did)
end_rules

#       This is a list of all of the drain identifiers (did's) that are valid in this file.
#       There may be only one drain_list[ ] entry in the file.

drain_list [ 1 2 3 4 5 ]

| - - - Pass/Fail - - - DELIVER MAIL
              | - - - Pass - - - KEYWORD FILTER -  |

| - - - Fail - - - - - - - DELIVER MAIL

- - > SIZE FILTER                     Pass
                                          \
              | - - - Fail - - - BINARY FILTER - - -   | - - - Fail - - - - - - - AUDIT MSG

#       This is the starting drain id, the size filter.
flow (1)

drain_filter ( size pass_drains[2] reject_drains[4] 1 )
drain_filter ( keyword pass_drains[3] reject_drains[3 5] 2 )
drain_terminal ( "Deliver Mail" 3 )
drain_filter ( binary pass_drains[2] reject_drains[5] 4 )
drain_terminal ( "Audit Message" 5 )
```

Filter flow modules should be as simple as possible. New or less technical users should be able to use the filters in a simple fashion and not be overwhelmed by too may options or too much sophistication. When there is a complicated capability in the system, it may be appropriate to provide a simpler version which is easier to use. For example, the key word search filter is based on regular expressions, but regular expressions are too intimidating to the uninitiated and more complex than what many need. So, the key word search only makes a subset of the functionality visible: tokens with optional wildcards at the beginning and end. For those who want to work with full regular expressions, that functionality can be provided in a logically, if not physically, separate filter which the less technical users can totally ignore.

Whenever possible, filters should have a per-message threshold rather than having a boolean all-or-nothing rejection criteria. For a key word or regular text filter this might be a given number of matches. For something like a binary filter this might be a certain sensitivity. Obviously, filters such as PGP signature verification will have a strict boolean behavior.

If a filter rejects a message, it must attach two kinds of audit messages to the edo. These should be attached in order of smallest to largest because, if memory is depleted in processing, the smaller message can be used in place of the large, while the reverse is not always true. Examples of these messages include the following.

1. A brief audit message.
    This a short, descriptive message which should describe the failure as well as possible, but be concise enough to be included in an audit record. In one embodiment the brief audit message is preferably less than 160 bytes.
2. A detailed audit message.
    This is a detailed message that tries to explain specifically why the message was rejected. For example, a key word filter would list the words that matched entries in the word list.

3. A generic audit message.

In one embodiment this is a message that is the same for all rejections. In another embodiment this message is configurable, so that the site can include information about the site security policy and how to contact the responsible administrators for assistance with the violation. In a further embodiment a generic reason module is created which can be used in conjunction with any filter.

A variety of filter types are configurable in the mail structure of the present invention. One type is a key word search filter, which in its simplest form scans the message for a match on any of the words included in a predefined list. Another type of filter is a binary filter, which is intended to catch mail which is not 'normal' text or includes nontext attachments. This is a nebulous pattern-recognition task. Things that should be caught include MIME attachments, uuencoded files, btoa encoded files, binhex encoded files, as well as raw binary, encrypted mail and shar files. Normal electronic mail written in natural human language such as English should pass.

A third type of filter is a size filter. It is desirable to have a filter that rejects messages based on the message size. The threshold (T) would be configurable and specified in bytes. The message would be rejected if the message size (M) was greater than or equal to the size threshold:

$$M \geq T \qquad (1)$$

In one embodiment the threshold is somewhat fuzzy. Where the fuzziness feature is implemented it will be a configurable value (F) in bytes. Given a random value (R) uniformly distributed between zero and one, the threshold function would be:

$$M \geq T + F * 2\left(R - \frac{1}{2}\right) \qquad (2)$$

If the overhead of filtering is deemed to be excessive, a filter could be constructed which applies filters to randomly selected messages. The frequency of filtering could be selected as a tradeoff between throughput and completeness of coverage. This would simply have a single configurable value which would be the percentage of messages that would be filtered. Those skilled in the art will recognize there are a wide variety of filter techniques which may be incorporated without exceeding the scope and spirit of the present invention.

Modifiers are map objects that take a single input and yield a single output. Modifiers are used for actions that do not select the routing of the message, such as adding attachments or some sort of uniform modification of the message. An example of the first would be adding a generic rejection reason. An example of the second would be sanitizing the message headers.

For one implementation of a key word search filter the intent was to have a configurable "generic" rejection reason that would be the same for all messages that violated the filter. There are three problems with this approach. First, the rejection reason will always be added, even if it is never used, which is undesirable overhead, especially if filters are being chained. Second, from an engineering perspective, all filters will need to have the code to support this capability built into them. Third, from the user perspective this approach provides no simple way to have a single generic rejection reason shared by multiple filters.

Figure 18:
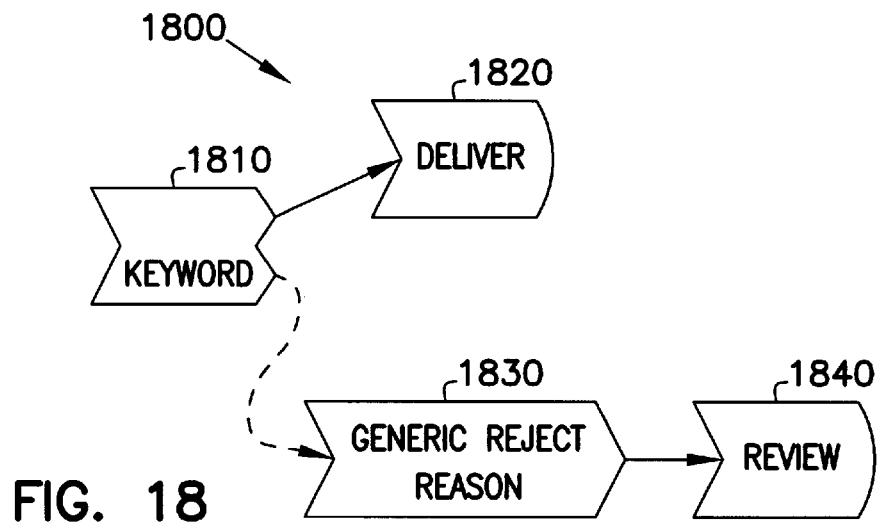
FIG. 18 shows an example a conventional method of attaching a rejection reason to messages.
Figure 19:
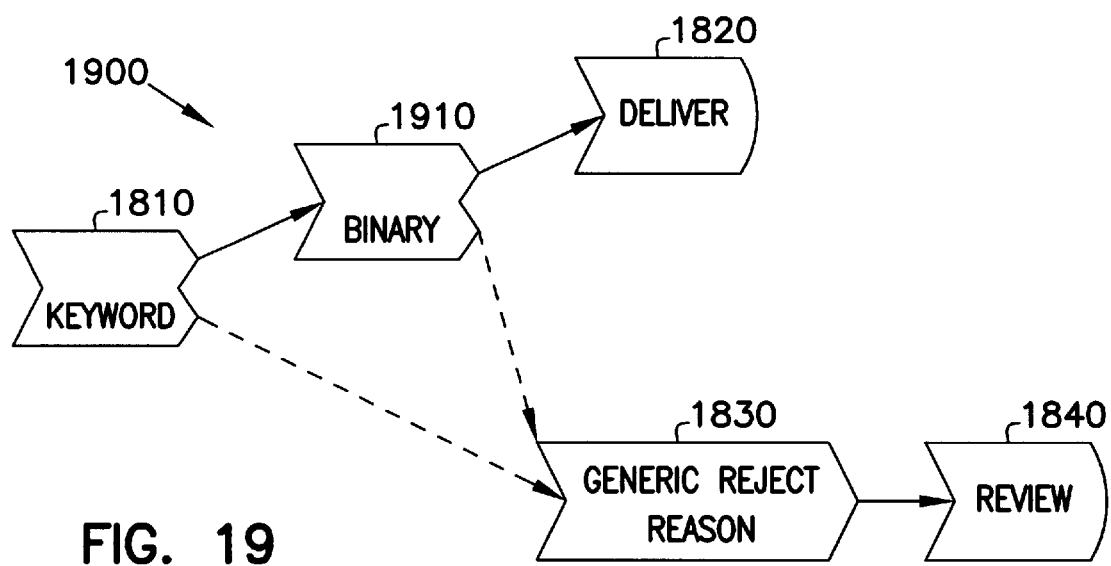
FIG. 19 shows an example an expanded method of attaching a rejection reason to messages according to one embodiment of the present invention.

As a result, filters constructed as part of the mail framework of the present invention will not attach generic rejection reasons to messages. Instead, a simple one-in, one-out data modifier will be created which attaches a generic rejection reason to all messages that flow through. Functionality equivalent to the prior design is illustrated in FIG. 18. An alternative use is illustrated in FIG. 19.

The configuration information for the generic rejection reason modifier 1830 is simply the text of the rejection reason. The text is kept in a simple ASCII file which will be attached verbatim to the message. Since no other information is configurable, the system configuration file format is not used. The filter.conf file's conf_info entries will include the path to the file, but the token field is not used. For example:

```
Modifier[GenericRejectReason]
    drain_list [ did1 did2 ]
    conf_modifier ( GenericRejectReason
              conf_info( /etc/filter/generic_reason/policy.text did1) generic_reject_1 )
    conf_modifier(GenericRejectReason
              conf_info( /etc/filter/generic_reason/call_admin.text did2) generic_reject_2 )
```

Note that utility functions should probably be added to the filter library to support opening and reading text files with the same file locking semantics used by the configuration library so that deadlock and race conditions will be avoided.

Another function which may be provided through a modifier is to sanitize the message headers. Sanitizing the message headers means to remove information from the headers that potentially discloses information about the internal network which is not required by the mail delivery system to deliver the mail. Initially, this involve removing the Received-by lines on out-bound mail. Many other modifiers are also possible, such as ones that apply digital signatures or encrypt messages based on the destination address. The examples given in the discussion of the modifiers' functionality are offered for illustration and not intended to be exclusive or limiting.

Terminal objects ("drains") are generally simple and may not be dynamically configurable. The discussion following details various types of terminals and their configuration information. Most identifiers and token names can be adjusted to suit the needs of the user interface. The examples are offered as illustrations and are not intended to be exclusive or limiting in any way.

One type is the 'deliver to recipient' terminal. This action is to deliver the message on to the senders intended recipients. This terminal is normally placed at the end of a filter chain as the action for messages that pass all of the filters. It may be used on failed messages as well, if the site policy favors rapid delivery over highly accurate prevention. There are no configurable options for this terminal. A single entry will be preconfigured in the configuration file filter.conf:

```
Terminal[Deliver]
    conf_terminal ( Deliver conf_info (none none ) "Deliver Mail" )
```

The "return to sender" terminal returns the message to the sender. The rejected message can include the detailed rejection reason, the generic rejection reason, or the brief rejection reason. If the filter is configured to return the generic reason, but one has not been attached, it will use the brief rejection reason instead. The only configurable option is the type of rejection message. This information will be included in the token field of the configuration information. These entries will not have separate configuration files. In the embodiment where there are only three possible configurations, all three should be preconfigured in the default installation.

```
Terminal[ReturnToSender]
conf_terminal ( ReturnToSender conf_info ( none brief )
    "Return w/brief" )
conf_terminal ( ReturnToSender conf_info ( none generic )
    "Return w/generic" )
conf_terminal ( ReturnToSender conf_info ( none detailed )
    "Return w/details" )
```

The "mail to reviewer" terminal encapsulates the message and sends it on to an auditor. The message must be encapsulated as either a MIME attachment or simply an indented block of text. In one embodiment, this choice is configurable. In an alternate embodiment, the choice is not configurable, and is preconfigured to support a single delineation (such as an indented text block). It is important that the message be encapsulated in some manner so that common program mailer attacks are ineffectual when the message is sent to the reviewer. Otherwise, one could construct a filter that detects the attack and forwards it on to attack the auditor. This is a convenient method to get information to the auditor, but mail forwarded in this fashion cannot be properly forwarded on by the reviewer. If sending is dependent upon the reviewer, then the reviewer will need to use a manual review tool. The configurable options of this terminal are the e-mail address of the recipient of the message, the burb name of where the electronic mail address is, the choice of rejection message to include (if any) and whether or not to include the message or just the rejection message. A single configuration file will exist to contain the configuration information for all terminals of this type. The information in config.info will be the path to the configuration file and the terminal identifier. For example:

```
Terminal[MailToReviewer]
conf_terminal ( MailToReviewer conf_info ( /etc/filter/mailaudit.conf Charlie ) "Charlie" )
conf_terminal ( MailToReviewer conf_info ( /etc/filter/mailaudit.conf Linus ) "Linus" )
conf_terminal ( MailToReviewer conf_info ( /etc/filter/mailaudit.conf Lucy ) "Lucy" )
```

One example of the contents of the corresponding mail audit configuration file (mailaudit.conf) is illustrated in the following example.

| Mail Audit Configuration File |
| --- |
| begin_rules |
| # |
| #    conf_id:    must match the conf_info ( token ) field in filter.conf |
| #    audit_level:    one of "none", "brief", "generic" or "detailed" |
| #    include_msg:    either "yes" or "no" |
| #    address:    the e-mail address to which mail should be sent |
| #    burb:    the burb where the reviewer's e-mail address is located |
| #    default is:    trusted |
| # |
| mailaudit ( conf_id audit_level include_msg address burb ) |
| end_rules |
| |
| mailaudit ( Charlie detailed yes charlie@kite.com internal ) |
| mailaudit ( Linus generic no lv@blanket.org external ) |
| mailaudit ( Lucy brief yes expert@nickel.psychiatrist.com internal ) |

Mail messages may be very large, especially for a binary filter or a message size filter. The "log to file" terminal logs messages to a file in a directory. The directory is configurable. There will be a single instance of one such directory preconfigured on the system. When configuring a new instance, the directory will need to be created, typed, and added to the facility that rolls over audit and log files. If there is a manual review tool it will be able to process messages from this directory. This could be used in a manner analogous to strikeback reports, mail a simple notice, and store the whole thing in a file. The mail notifier described previously would be used in this scenario to send a brief or generic rejection notice. The configurable options include the directory to use when writing out the message, the choice of rejection message to include (if any) and whether or not to include the message or just the rejection message. A single configuration file will exist to contain the configuration information for all terminals of this type. Two entries will be preconfigured; one for each of the standard flows. The information in config_info will be the path to the configuration file and the terminal identifier. For example:

```
Terminal[LogToFile]
conf_terminal ( LogToFile conf_info ( /etc/filter/fileaudit.conf intext )
    intext )
conf_terminal ( LogToFile conf_info ( /etc/filter/fileaudit.conf extint )
    extint )
```

An example of the contents of the corresponding file audit configuration file is shown in the following example.

| Mail Audit Configuration File |
| --- |
| begin_rules |
| # |
| #    conf_id:    must match the conf_info ( token ) field in filter.conf |
| #    audit_level:    one of "none", "brief", "generic" or "detailed" |
| #    include_msg:    either "yes" or "no" |
| #    directory:    directory where message files will be written |
| # |
| fileaudit ( conf_id audit_level include_msg directory ) |
| end_rules |
| |
| fileaudit ( intext detailed yes /var/spool/filelog/intext ) |
| fileaudit ( extint generic no /var/spool/filelog/extint ) |

Another terminal type is the "audit" terminal. This terminal sends a message to the audit device. This will be of a type specific to filtering and will include the source burb, destination burb and the brief audit message. Nothing is configurable in this terminal. A single entry will be preconfigured in filter. conf.

```
Terminal[Audit]
    conf_terminal ( Audit conf_info ( none none ) "Audit Message" )
```

The terminal examples described above are exemplary only and not intended to be exclusive or limiting. Those skilled in the art will recognize that other terminal types may be constructed without exceeding the spirit and scope of the present invention.

Although the present invention has been described with reference to the preferred embodiments, those skilled in the art will recognize that changes may be made in form and detail without departing from the spirit and scope of the invention.

APPENDIX I
Filter Configuration File Example

```

#   Description: Configures the terminals, modifiers and filters for mail filtering.

#   what is configurable:

#   conf_info(path token):

#   Configuration information for terminals, modifiers and filters are all
specified in the same way
#   using conf the info rule. This rule includes a path to a configuration
file and a token.
For
#   simple items, the token alone may be sufficient. For others, the file
may include everything
#   and the token may not be used. if multiple items share a configuration
file, then the file may
#   be specified by the path and the token may indicate a specific entry in
the file. If a token or
#   path field is unused it must be set to the string "none". This means
that "none" cannot be
#   used as a valid value for either of these fields.

#   conf_terminal ( terminal conf_info( ) conf_id ):

#   A configured terminal is given with the conf_terminal rule. This
associates an identifier with
#   the terminal type and this set of configuration information. For many
there will be no
#   configurables, so they may be preconfigured and the user will not be
able to configure
#   additional ones. The terminal field must contain a valid field from the
Terminal[ ] list.

#   conf_modifier ( modifier conf_info( ) conf_id )

#   A configured modifier is given with the conf_modifier rule. This
associates an identifier with the
#   modifier type and this set of configuration information. The modifier
field must contain a valid field
#   from the Modifier[ ] list.

    conf_filter ( filter conf_info( ) conf_id )

#   A configured filter is given with the conf_filter rule. This associates
an identifier with the
#   filter type and this set of configuration information. The filter field
must contain a valid field
#   from the Filter[ ] list.

#############################################################

```

APPENDIX I
Filter Configuration File Example
-continued

```
# Examples:

#FILTERS:
#   Configuring a key word search filter:
#   conf_filter( KeyWord conf_info (/etc/filter/kws/kws.conf none)
keyword)

#   Configuring a size filter:
#   conf_filter( Size conf_info (/etc/filter/size/size.conf size) size)

#   Configuring a binary filter:
#   conf_filter( Binary conf_info /etc/filter/binary/binary.conf binary)
binary)

# ModifierS:
#   Configuring a generic rejection reason modifier:
#   conf_modifier( GenericRejectionReason" conf_info(
        /etc/filter/generic_reason/generic.file none) generic_Modifier)

# TERMINALS:
#   Configuring the log to file terminal:
#   conf_terminal( "LogToFile" conf_info(/etc/filter/fileaudit.conf
        intext) log_to_file)

#   Configuring the mail to reviewer terminal:
#   conf_terminal( "MailToReviewer" conf_info
(/etc/filter/mailaudit.conf John) "John Smith")

#   Configuring the audit file terminal:
#   conf_terminal ("Audit" conf_info(none none) audit_msg) #
######################################################## begin_rules
    conf_info(path token)
    conf_terminal ( terminal conf_info() conf_id)
    conf_modifier ( modifier conf_info conf_id)
    conf_filter ( filter conf_info conf_id)
end_rules list of terminal module types. There may only be one such list.

Terminal [ "MailToReviewer" "LogToFile" "Audit" "Deliver"
"ReturnToSender" ]

#   list of modifier module types. There may only be one such list.

Modifier [ "GenericRejectionReasan" ]

#   list of filter module types. There may only be one such list.

Filter [ "Size" "KeyWord" "Binary" ]

#   Configuring the return to sender terminal:
conf_terminal ( ReturnToSender conf_info(none brief) "Return w/brief" )
conf_terminal ( ReturnToSender conf_info(none generic) "Return
w/generic" )
conf_terminal ( ReturnToSender conf_info(none detailed) "Return
w/details" )

# Configuring the deliver to recipients terminal:
conf_terminal ( Deliver conf_info(none none) "Deliver Mail" )
# Configuring the audit terminal:
conf_terminal ( Audit conf_info ( none none ) "Audit Message" )
© 1996 Secure Computing Corporation
```

What is claimed is:

1. A method of filtering electronic mail messages, comprising the steps of:

defining a plurality of nodes, wherein each node identifies an operation and wherein one of the nodes is a filter node which identifies messages to filter;

interconnecting nodes from the plurality of nodes such that the interconnected nodes describe a security policy; and reassembling an electronic mail message from two or more packets;

passing the electronic mail message through the filter node, wherein the step of passing an electronic mail message through the filter node includes the steps of:

determining if the electronic mail message is one which is to be filtered;

if the electronic mail message is identified as to be filtered, processing the electronic mail message through one or more filter flows; and otherwise delivering the electronic mail message without filtering.

2. The method of claim 1, wherein the step of processing the electronic mail message comprises the steps of:

analyzing the message to determine if it has a particular characteristic; and disposing of the electronic mail message based on the outcome of the analysis.

3. The method of claim 2, wherein the step of disposing of the electronic mail message comprises the step of delivering the message.

4. The method of claim 2, wherein the step of disposing of the electronic mail message comprises the step of rejecting the message.

5. The method of claim 2, wherein the step of disposing of the electronic mail message comprises the step of transmitting an audit message.

6. The method of claim 2, wherein the step of disposing of the electronic mail message comprises the steps of:

delivering the message;

rejecting the message; and transmitting an audit message.

7. The method of claim 1, wherein the step of processing the electronic mail message comprises the step of modifying the electronic mail message.

8. The method of claim 7, wherein the step of modifying the electronic mail message comprises the step of altering an electronic mail message address.

9. The method of claim 7, wherein the step of modifying the electronic mail message comprises the step of altering an electronic mail message header.

10. A system for filtering electronic mail, comprising:

means for receiving electronic mail messages, including a first electronic mail message, from one or more sources;

an analysis module, for determining whether to filter the first electronic mail message, wherein the analysis module includes:

node defining means for defining a plurality of nodes, wherein each node identifies an operation and wherein two of the nodes are filter nodes wherein each filter node includes a filter, for analyzing characteristics of the first electronic mail message; and one or more terminals, including a first terminal, wherein each terminal is connected to a node and wherein the first terminal is connected to one of the filter nodes in order to deliver the first electronic mail message to one or more destinations.

11. The system of claim 10, wherein the analysis module further comprises a plurality of modifiers, including a first modifier, wherein each of the plurality of modifiers operates to modify the first electronic mail message.

12. A method of managing a filter map, comprising the steps:

identifying one or more nodes to be included in the map, wherein each node defines an operation to be performed on an electronic mail message, wherein the step of identifying includes the step of defining a security policy;

defining an order in which operations are to be performed on the electronic mail message;

graphically positioning each of the one or more nodes according to the defined order; and graphically identifying connections between the nodes as a function of one or more routing paths available from any one node.

13. A method for constructing an electronic mail filter having one or more message routing paths, comprising the steps:

identifying a policy describing the one or more message routing paths;

defining a plurality of filter nodes for analyzing electronic mail messages;

defining a plurality of modifier nodes for modifying electronic mail messages;

defining one or more terminal nodes for delivering electronic mail messages and other electronic information; and interconnecting the plurality of filter nodes, modifier nodes and terminal nodes so as to implement the policy.

14. An electronic mail system, comprising:

a mail filter having a plurality of filter objects, wherein the filter objects are arranged in a flow which enforces a security policy; and a mail delivery agent connected to the mail filter, wherein the mail delivery agent receives an electronic mail message and routes the electronic mail message based on a mail filter policy, wherein the mail filter policy determines mail to queue and mail to pass on;

wherein the mail filter retrieves electronic mail messages queued by the mail delivery agent and filters the retrieved electronic messages according to the security policy.

15. The electronic mail system according to claim 14, wherein the plurality of filter objects includes a terminal node type.

16. The electronic mail system according to claim 14, wherein the plurality of filter objects includes a modifier node type.

17. The electronic mail system according to claim 14, wherein the plurality of filter objects includes a filter node type.

18. The electronic mail system according to claim 14, wherein the plurality of filter objects includes a plurality of node types, wherein each node type includes an initialization section, a message processing section and a node clean-up section.

19. The electronic mail system according to claim 14, wherein the plurality of filter objects includes a plurality of node types, wherein one of the plurality node types appends information on to a mail message.

20. The electronic mail system according to claim 14, wherein the plurality of filter objects includes a plurality of node types, wherein one of the plurality of node types generates audit messages.

21. The electronic mail system according to claim 14, wherein the mail filter policy is stored in a mail filter policy file as a set of burb pairs, wherein each burb pair includes a first and a second burb, wherein messages from the first to the second burb are queued by the mail delivery agent.

22. The electronic mail system according to claim 18, wherein the mail filter policy is stored in a mail filter policy file as a set of burb pairs, wherein each burb pair includes a first and a second burb, wherein messages from the first to the second burb are queued by the mail delivery agent.

23. A method of filtering electronic mail messages, comprising the steps of:

provinding a plurality of node types;

defining a security policy wherein defining includes specifying an order in which the plurality of node types are to be connected;

connecting the plurality of node types according to the security policy;

receiving an electronic mail message; and analyzing the electronic mail message as a function of the security policy.

24. The method according to claim 23, wherein the step of connecting includes the steps of:

displaying the plurality of node types as icons within a visual medium;

placing copies of the icons on the visual medium in response to input from a user; and connecting the icons placed on the visual medium.

25. The method according to claim 23, wherein the step of connecting includes the step of configuring the plurality of nodes types to perform a function from one of a set of functions including forwarding, rejecting and returning the message.

26. An electronic mail filter, comprising:

an analysis module for analyzing an electronic mail message, wherein the analysis module includes:

node defining means for defining a plurality of nodes, wherein each node identifies an operation and wherein one of the nodes is a filter node which identifies messages to filter; and interconnecting means for interconnecting nodes from the plurality of nodes such that the interconnected nodes describe a security policy; and an output module, connected to the analysis module, for generating a plurality of output messages, wherein one of the plurality of messages is generated as a function of analysis of the electronic mail message by the analysis module.

27. The electronic mail filter of claim 26, wherein the node defining means includes means for creating a plurality of individual independent filter, modifier and terminal nodes; and wherein the interconnecting means includes means for interconnecting the plurality of individual filter, modifier and terminal nodes.

* * * * *

UNITED STATES PATENT AND TRADEMARK OFFICE
CERTIFICATE OF CORRECTION

PATENT NO.: 6,072,942

DATED: June 6, 2000

INVENTOR(S): Stockwell et al.

It is certified that error appears in the above-identified patent and that said Letters Patent is hereby corrected as shown below:

On drawing Figs. 11, 12, 13, 14, 15, 16 and 17, please change the number identifying KEYWORD from "1100" to --1110--.

Signed and Sealed this

Twenty-second Day of May, 2001

Attest:

NICHOLAS P. GODICI

*Attesting Officer*  *Acting Director of the United States Patent and Trademark Office*